(12) United States Patent
Strecker et al.

(10) Patent No.: US 7,792,248 B2
(45) Date of Patent: Sep. 7, 2010

(54) METHODS OF EXAMINING AN ITEM OF LUGGAGE BY MEANS OF AN X-RAY DIFFRACTION METHOD

(75) Inventors: Helmut Strecker, Hamburg (DE); Gabriel Zienert, Hamburg (DE); Armin Schmiegel, Hamburg (DE)

(73) Assignee: Morpho Detection, Inc., Newark, CA (US)

( * ) Notice: Subject to any disclaimer, the term of this patent is extended or adjusted under 35 U.S.C. 154(b) by 105 days.

(21) Appl. No.: 11/571,109

(22) PCT Filed: Jun. 28, 2005

(86) PCT No.: PCT/EP2005/006954

§ 371 (c)(1),
(2), (4) Date: Oct. 1, 2008

(87) PCT Pub. No.: WO2006/000456

PCT Pub. Date: Jan. 5, 2006

(65) Prior Publication Data

US 2009/0016487 A1    Jan. 15, 2009

(30) Foreign Application Priority Data

Jun. 28, 2004    (DE) .................... 10 2004 031 130

(51) Int. Cl.
*G01N 23/04* (2006.01)
(52) U.S. Cl. ................. 378/57; 378/70; 378/87
(58) Field of Classification Search ............. 378/57, 378/70–89, 98.11, 98.12
See application file for complete search history.

(56) References Cited

U.S. PATENT DOCUMENTS

| 5,642,393 A | 6/1997 | Krug et al. |
| 6,442,233 B1 | 8/2002 | Grodzins et al. |
| 2004/0120456 A1 | 6/2004 | Ellenbogen |
| 2006/0104414 A1* | 5/2006 | Mayo ..................... 378/57 |

FOREIGN PATENT DOCUMENTS

| DE | 19954662 A1 | 6/2001 |
| FR | 2 801 104 | 5/2001 |
| WO | WO 01/35051 A2 | 5/2001 |
| WO | WO 2003/065077 A3 | 8/2003 |
| WO | WO 2004/072685 A1 | 8/2004 |
| WO | WO 2004/074871 A1 | 9/2004 |

OTHER PUBLICATIONS

German Patent Court Decision dated Jul. 26, 2006 (7 pages).

* cited by examiner

*Primary Examiner*—Courtney Thomas
(74) *Attorney, Agent, or Firm*—Armstrong Teasdale LLP

(57) ABSTRACT

The invention relates to a method of examining an item of luggage 1, in which an X-ray fluoroscopic image of the whole item of luggage 1 is produced first, then planiform suspect regions 4, 5, 6 in the X-ray fluoroscopic image are determined and the scanning time during the following production of an X-ray diffraction image depends on whether the X-ray beam is located specifically in a planiform suspect region 4, 5, 6, wherein the scanning time heads towards zero outside a planiform suspect region 4, 5, 6 and lasts long enough inside a planiform suspect region 4, 5, 6 to obtain an informative X-ray diffraction image.

14 Claims, 2 Drawing Sheets

METHODS OF EXAMINING AN ITEM OF LUGGAGE BY MEANS OF AN X-RAY DIFFRACTION METHOD

Figure 1:
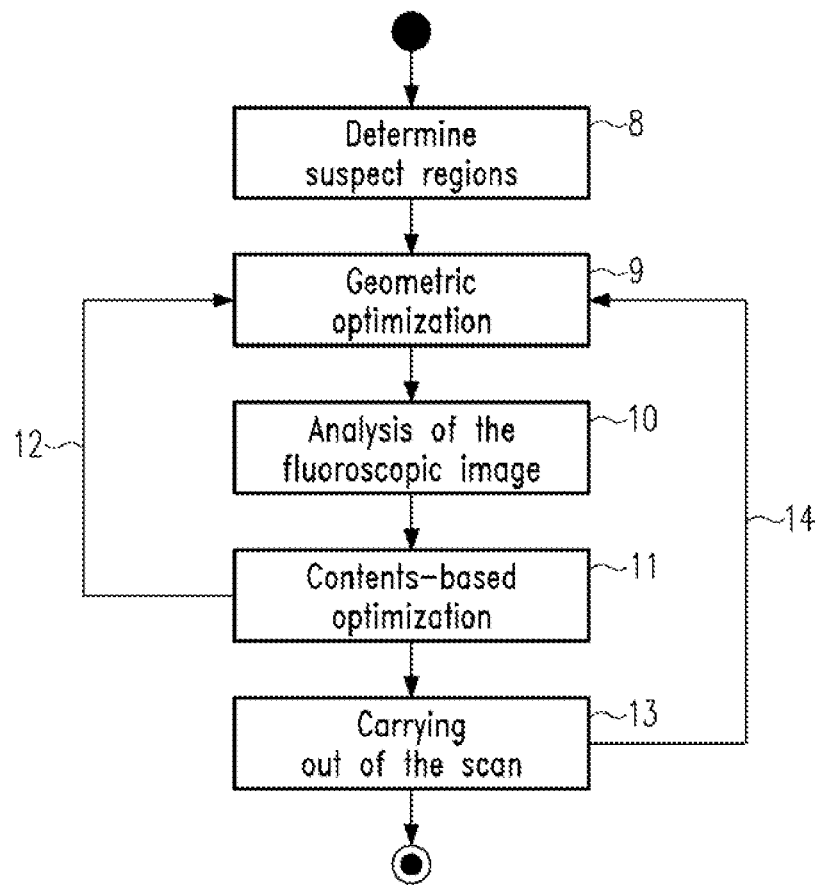

The invention relates to a method of examining an item of luggage by means of an X-ray diffraction method.

Methods of examining items of luggage for dangerous substances by means of X-radiation are known. To this end, the whole item of luggage is transilluminated by means of a scanner and an X-ray fluoroscopic image generated items which have a suspicious shape can then be recognized in the X-ray fluoroscopic image. Although a high throughput of items of luggage is associated with this method, it is also affected by a high error rate as regards the actual contents.

In order to reduce the error rate it is known to generate an X-ray diffraction image instead of an X-ray fluoroscopic image. As the molecular structure of the contents of the case is analyzed with this method and features such as shape and density are ignored, dangerous substances—such as for example explosives—cannot be overlooked on the grounds that they do not look harmful. In addition, as a rule harmless substances do not trigger false alarms even if they have a similar shape or density to explosives. However, in the case of the X-ray diffraction method this increase in certainty is at the cost of a clear increase in time spent. In the known systems, therefore, a throughput of only 40 to 60 items of luggage per hour is achieved.

It is also known to produce X-ray fluoroscopic images first in a single luggage checking unit and identify individual points in suspect regions. These points are then examined to see whether suspicious substances or objects may be present there. For all the points at which this is the case, an X-ray diffraction image is then recorded in the same luggage checking unit. However, this method is time-consuming and also, because only points are examined, leads to a not inconsiderable number of false alarms.

The object of the invention is therefore to propose a method of examining an item of luggage which on the one hand displays only a low false alarm rate, but on the other hand makes possible a high throughput of items of luggage.

This object is achieved by a method with the features of claim 1. In a luggage checking unit, an X-ray fluoroscopic image of a whole item of luggage is produced first. This can take place in a very short period of time. Within the X-ray fluoroscopic image, planiform suspect regions are determined where dangerous substances could be present. An X-ray diffraction image of the item of luggage is then produced. As the whole item of luggage no longer urgently needs to examined by means of the X-ray diffraction method, but only small predetermined planiform suspect regions, the necessary scanning time is significantly reduced. Outside the planiform suspect regions, the scanning time is reduced practically to zero, and the X-ray beam is to be found there only on the basis of the travel times over these regions. The time thus saved is available—if desired—as additional scanning time in the planiform suspect regions, with the result that informative X-ray diffraction images can be produced there. At the same time, through the use of the X-ray diffraction method an exceedingly reliable detection of dangerous substances or the presence of no dangerous substance in a planiform suspect region is achieved. The result is a high throughput of items of luggage with an outstandingly low false alarm rate. In the following, for the sake of simplicity, instead of planiform suspect regions the term suspect regions will be used.

A further advantageous development of the invention provides that the suspect regions are subjected to a geometric optimization, wherein the respective scanning time depends on the geometry of the suspect region, the travel time of the diffraction beam in the suspect region and the beam geometry of the diffraction beam. The scanning process of the following X-ray diffraction method can be optimized by such a geometric optimization, as the X-ray beam can be optimally guided over the individual suspect regions.

A further advantageous development of the invention provides that suspect regions which lie closely alongside each other or overlap are merged with each other to form an examination area. The geometric optimization is thereby further improved, as the beam guiding can be still further optimized in the case of the X-ray diffraction method.

A further advantageous development of the invention provides that a suspect region is broken down into several examination areas. In one or the other case it is more advantageous if a single suspect region is broken down into several examination areas, in order that an optimized guiding of the X-ray beam during the scanning process can take place. This applies although as a rule a merging—named above—of suspect regions to form a single examination area leads to shorter scanning times.

A further advantageous development of the invention provides that the size of at least one suspect region is optimized. In particular when several suspect regions are merged to form a single examination area, it may be advantageous to change—even increase—the size of a suspect region in order that a geometry of the scanning range is present which can more easily be covered.

A further advantageous development of the invention provides that at least one suspect region is subjected to a contents-based optimization in which the X-ray flow to be expected is determined. Suspect regions or parts thereof in which higher X-ray flows are necessary in order to obtain an informative X-ray diffraction image are estimated to have a longer scanning time than regions where less X-ray flow is necessary. These different scanning times then play a part in the optimization of the scanning process. It is also advantageous to exclude suspect regions which cannot be penetrated at all by X-radiation from the region to be scanned, and not to produce X-ray diffraction images of these. Unnecessary time producing an X-ray fluoroscopic image is thereby saved, as an X-ray fluoroscopic image cannot be taken in these impenetrable suspect regions in any case.

A further advantageous development of the invention provides that a time-optimized scanning path is calculated for the production of the X-ray diffraction image, using the data obtained from the geometric optimization and the contents-based optimization. Through the combination of the data obtained from the two named optimizations, the scanning path can be chosen so that all the suspect regions are optimally transilluminated and at the same time the scanning time is kept as short as possible.

A further advantageous development of the invention provides that, to determine the suspect regions, the X-ray fluoroscopic image of an upstream luggage checking unit with suspect regions given therein is used and the determination of the suspect regions takes place by means of a comparison of an additional X-ray fluoroscopic image, which is taken in the luggage checking unit, with the X-ray fluoroscopic image. It is thereby possible to refer to a fluoroscopic image taken beforehand in another luggage checking unit and thus use the data obtained from this first luggage checking unit for the second luggage checking unit, which saves time, as the whole method carried out in the first luggage checking unit does not have to be repeated once more in the second luggage checking unit.

A further advantageous development of the invention provides that, to control the diffraction scan, three-dimensionally resolved density information of an upstream luggage checking unit with CT technique is used. Even greater certainty regarding the avoidance of false alarms is thereby achieved, as the dangerous substances can be even better identified.

An advantageous development of the invention provides that the X-ray fluoroscopic image is produced by a line scanner, a cone envelope beam or a fan beam. In this way an X-ray fluoroscopic image is quickly produced in a particularly simple way and in proven manner, with the result that recourse can be had to decades of experience and the suspect regions in question can be very well determined. The X-ray fluoroscopic image is advantageously a monoenergetic or double-energy fluoroscopic image.

An identification of dangerous substances in an item of luggage is very reliably and yet quickly possible by means of the method according to the invention and the listed developments of this method.

Figure 2:
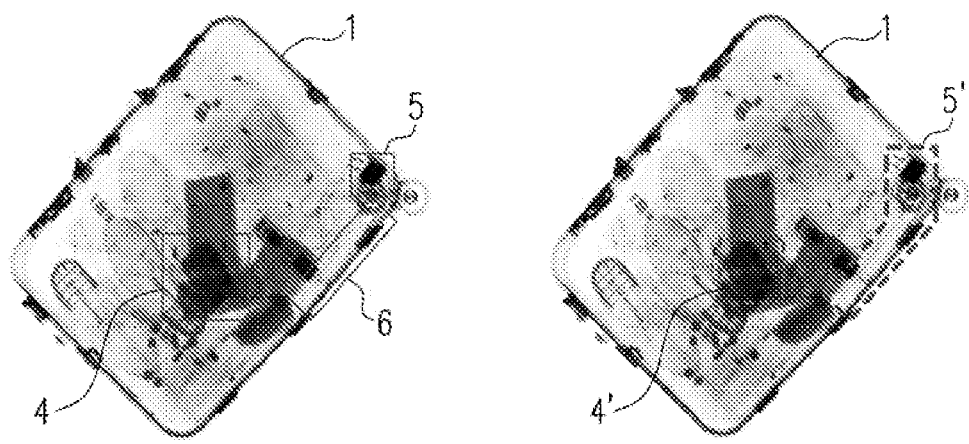

Advantageous versions of the invention are explained further with the help of the drawing. There are shown in detail:

FIG. 1 a flowchart of a part of the method according to the invention,

FIG. 2 a schematic representation of a geometric optimization process and

Figure 3:
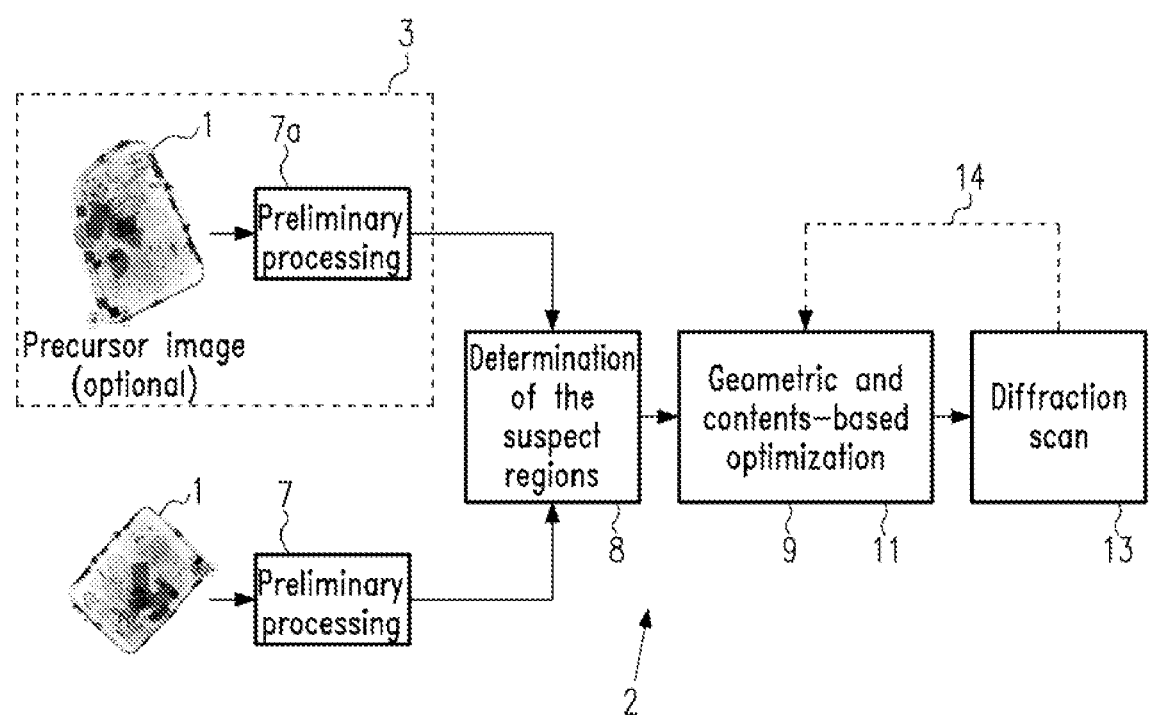

FIG. 3 a schematic representation of a method according to the invention with optional upstream connection of a further luggage checking unit.

In FIG. 1 the principle is shown of a method of an image-controlled X-ray diffraction scan. For this a luggage checking unit 2 (see FIG. 3) has, in addition to an X-ray diffraction scanner a pre-scanner or line scanner which produces a fluoroscopic image of the item of luggage 1 to be examined. A determination 8 of the suspect regions takes place in this fluoroscopic image.

A geometric optimization 9 follows. For this, the beam geometry of the diffraction beam is taken into account. Account is also taken of the travel and scanning times for the production of the X-ray diffraction image still to be taken. The aim is to examine the ascertained suspect regions 4, 5, 6 (see FIG. 2) as efficiently as possible without having to lose time for periods in which the X-ray beam is outside the suspect regions 4, 5, 6. This step is designated analysis 10 of the fluoroscopic image in FIG. 1.

In a second phase a contents-based optimization 11 takes place. This means that those areas in the suspect regions are determined which require a higher quantum efficiency, i.e. have to be exposed for a longer time to the X-radiation in order that an X-ray diffraction image displays a sufficiently good spectral quality. Under certain circumstances, regions of which it is known that a fluoroscopy is not possible are masked out. However, because nothing whatever is, as a result, said about the contents in this region, this must be desired beforehand by the user. If, because of the contents-based optimization 11, other scan paths result than on the basis of the geometric optimization 9, there is a repetition 12 of the geometric optimization, in order to once again reduce the scanning time.

After the optimization processes have been carried out, the diffraction scan 13 takes place. Should further examination still be necessary thereafter, a repetition 14 of the optimization algorithm takes place.

Through the method described above, the X-ray diffraction analysis is temporally optimized with the help of the obtained image information.

In FIG. 2 it is shown how such a temporal optimization on the basis of the changes to the regions in which a substantial X-ray diffraction is carried out takes place by means of changes to the volume to be scanned, namely of the suspect regions 4, 5, 6, 4', 5'. The optimization is achieved in that firstly the scanning path, i.e. the spatial sequence of the analysis, is optimized. For this, the second suspect region 5 and the third suspect region 6, which lie closely alongside each other, are merged to form a single second optimized suspect region 5'. Other than with suspect regions lying closely alongside each other, this can be carried out equally well for overlapping areas.

However, it is equally possible that another suspect region (not represented) is split into several optimized suspect regions if an analysis of the two divided areas proves more sensible in terms of time.

A further case of the geometric optimization 9 is represented as regards the first suspect region 4. The size of this first suspect region 4 is reduced as part of the geometric optimization 9.

Different scanning speeds are defined within the two optimized suspect regions 4', 5'. For example, the first optimized suspect region 4', which contains a radio, is analyzed for longer than the second optimized suspect region 5'.

As not the whole item of luggage 1 has to be comprehensively scanned, but only very small, predetermined optimized suspect regions 4', 5', the required scanning time is significantly less. This still applies even if the optimized suspect regions 4', 5' are passed through at a smaller scanning speed than was the case with the uniform scanning of the whole item of luggage 1 used hitherto. Even then there is an enormous saving of time, as only small volumes require substantial scanning; the X-ray beam travels as quickly as possible over the regions tying outside the suspect regions.

In FIG. 3 the method according to the invention is represented in summary. The method is firstly explained without discussing the optional use of an upstream luggage checking unit 3.

The fluoroscopic image, taken in the luggage checking unit 2, of the item of luggage 1 is subjected to a preliminary processing 7. The determination 8 of the suspect regions follows. The optimization algorithm already described with reference to FIG. 1 is then carried out. A geometric optimization 9 takes place and also a contents-based optimization 11, between which an analysis 10 of the fluoroscopic image is carried out. The X-ray diffraction scan 13 along the optimized travel path over the whole item of luggage 1 follows, in each case at the ascertained speeds, depending on whether the X-ray beam runs over a suspect region or is situated outside one such. If the analysis shows further scans to be necessary, e.g. because a suspicion of explosives has not yet been properly allayed, a repetition 14 of the optimization algorithm is ordered.

Recourse can optionally also be had to the data of an upstream luggage checking unit 3. Normally, a preliminary stage is provided upstream of an X-ray diffraction apparatus, as the scanning of items of luggage can take place significantly more quickly in such an upstream luggage checking unit 3 by means of X-ray fluoroscopic images. If an item of luggage 1 is classified as suspicious there, then it is passed on to the luggage checking unit 2 for further examination, where an X-ray diffraction method is then carried out in order to obtain more precise information regarding the contents of the item of luggage 1. As a rule the suspect regions 4, 5, 6 are already ascertained in the upstream luggage checking unit 3. This information can be passed on to the luggage checking unit 2, with the result that, by means of the fluoroscopic image produced there, a simpler and quicker determination 8 of the position of the suspect regions 4, 5, 6 in this luggage checking unit 2 can take place. This it not trivial, as the position of the item of luggage 1 has, as a rule, changed between the upstream luggage checking unit 3 and the luggage checking unit 2 and different mapping geometries apply for the fluoroscopic images. By means of special methods, which are not however a subject of the present application, it is possible however to reliably locate the suspect regions 4, 5, 6 which have been determined in the upstream luggage checking unit 3 in the fluoroscopic image of the luggage checking unit 2. This is then followed by the optimization algorithm described above and the carrying out of the diffraction scan 13.

The X-ray diffraction scan 13 can be controlled both by means of an analysis of a monoenergetic and of a double-energy fluoroscopic image. This also applies if, instead of one, several monoenergetic or double-energy fluoroscopic images are used for control purposes. Control of the X-ray diffraction scan 13 can furthermore be achieved using three-dimensionally resolved density information of a precursor apparatus with computed tomography (CT).

In summary, it can be said that with the help of the method according to the invention a clear reduction in scanning time when carrying out an X-ray diffraction scan 13 is to be achieved, which results in a significantly higher throughput rate of items of luggage 1 through the luggage checking unit 2, and at the same time the probability of false alarms can be clearly reduced.

LIST OF REFERENCE NUMBERS

1 Item of luggage
2 Luggage checking unit
3 Upstream luggage checking unit
4 First suspect region
4' First optimized suspect region
5 Second suspect region
5' Second optimized suspect region
6 Third suspect region
7, 7a Preliminary processing
8 Determination of the suspect regions
9 Geometric optimization
10 Analysis of the fluoroscopic image
11 Contents-based optimization
12 Repetition of the optimization
13 X-ray diffraction scan
14 Repetition of the optimization algorithm

The invention claimed is:

1. Method of examining an item of luggage comprising:
    obtaining a first X-ray fluoroscopic image of the whole item of luggage;
    identifying one or more planiform suspect regions in the first X-ray fluoroscopic image;
    calculating a travel path for an X-ray beam; and
    moving the X-ray beam along the travel path to obtain an X-ray diffraction scan of the item of luggage, wherein a scanning speed at which the X-ray beam moves depends on whether the X-ray beam is located in the one or more planiform suspect regions, wherein the scanning speed is faster outside the one or more planiform suspect regions than inside the one or more suspect regions, and is slow enough inside the one or more planiform suspect regions to obtain an informative X-ray diffraction image.

2. Method of examining an item of luggage according to claim 1, further comprising subjecting at least one of the one or more planiform suspect regions to a geometric optimization based on a geometry of the one or more planiform suspect regions, a travel time of the X-ray beam in the one or more planiform suspect regions and a beam geometry of the X-ray beam, wherein the geometric optimization reduces a time required to complete the X-ray diffraction scan.

3. Method of examining an item of luggage according to claim 2, further comprising merging at least two of the one or more planiform suspect regions which lie closely alongside each other or overlap to form a single examination area.

4. Method of examining an item of luggage according to claim 2, further comprising breaking at least one of the one or more planiform suspect regions into several examination areas.

5. Method of examining an item of luggage according to claim 2, further comprising optimizing the size of at least one of the one or more planiform suspect regions.

6. Method of examining an item of luggage according to claim 1, further comprising subjecting at least one of the one or more planiform suspect regions to a contents-based optimization in which an expected X-ray flow is determined.

7. Method of examining an item of luggage according to claim 6, further comprising fixing a scanning time for the at least one of the one or more planiform suspect regions according to the expected X-ray flow.

8. Method of examining an item of luggage according to claim 6, further comprising omitting the at least one of the one or more planiform suspect regions from the X-ray diffraction image if the at least one of the one or more planiform suspect regions is determined to be impenetrable.

9. Method of examining an item of luggage according to claim 2, further comprising subjecting at least one of the one or more planiform suspect regions to a contents-based optimization in which an expected X-ray flow is determined, and optimizing the travel path based on the geometric optimization and the contents-based optimization.

10. Method of examining an item of luggage according to claim 1, wherein said identifying one or more planiform suspect regions comprises comparing a second X-ray fluoroscopic image with the first X-ray fluoroscopic image, wherein one of the first X-ray fluoroscopic image and the second X-ray fluoroscopic image is obtained by an upstream luggage checking unit.

11. Method of examining an item of luggage according to claim 1, wherein said identifying one or more planiform suspect regions comprises using information relating to one or more extractable objects from the first X-ray fluoroscopic image.

12. Method of examining an item of luggage according to claim 1, further comprising obtaining three-dimensionally resolved density information from an upstream luggage checking unit with CT, wherein the scanning speed depends on the three-dimensionally resolved density information.

13. Method of examining an item of luggage according to claim 1, wherein the first X-ray fluoroscopic image is produced by a line scanner, using a fan beam.

14. Method of examining an item of luggage according to claim 1, wherein the first X-ray fluoroscopic image is one of a monoenergetic and a double-energy fluoroscopic image.

* * * * *